US012645076B2

(12) United States Patent
Tso et al.

(10) Patent No.: US 12,645,076 B2
(45) Date of Patent: Jun. 2, 2026

(54) HEAD-UP DISPLAY SYSTEM

(71) Applicant: FUYAO GLASS INDUSTRY GROUP CO., LTD., Fuqing (CN)

(72) Inventors: Fai Tso, Fuqing (CN); Lishan He, Fuqing (CN); Fengzhu Huang, Fuqing (CN); Dong Zeng, Fuqing (CN); Rui Zhu, Fuqing (CN); Jianping Chen, Fuqing (CN); Kohta Fukuhara, Fuqing (CN)

(73) Assignee: FUYAO GLASS INDUSTRY GROUP CO., LTD., Fuqing (CN)

( * ) Notice: Subject to any disclaimer, the term of this patent is extended or adjusted under 35 U.S.C. 154(b) by 370 days.

(21) Appl. No.: 18/565,893

(22) PCT Filed: Nov. 30, 2022

(86) PCT No.: PCT/CN2022/135209
§ 371 (c)(1),
(2) Date: Nov. 30, 2023

(87) PCT Pub. No.: WO2023/098690
PCT Pub. Date: Jun. 8, 2023

(65) Prior Publication Data
US 2024/0264437 A1 Aug. 8, 2024

(30) Foreign Application Priority Data
Nov. 30, 2021 (CN) .......................... 202111445611.3

(51) Int. Cl.
*G02B 27/01* (2006.01)

(52) U.S. Cl.
CPC ............................... *G02B 27/0101* (2013.01)

(58) Field of Classification Search
CPC .. G02B 27/0101; G02B 27/283; G02B 27/42; G02B 2027/012; G02B 2027/0185; G02B 2027/0194; G02B 1/10
(Continued)

(56) References Cited

U.S. PATENT DOCUMENTS 5,496,621 A * 3/1996 Makita ............... G02B 27/0101
359/359
9,715,110 B1 7/2017 Brown
(Continued)

FOREIGN PATENT DOCUMENTS

CN 106094213 A 11/2016
CN 205899060 U 1/2017
(Continued)

OTHER PUBLICATIONS

Korean Office Action (w/English translation) for corresponding Application No. 10-2023-7037950, dated Apr. 22, 2025, 19 pages.
(Continued)

*Primary Examiner* — Bumsuk Won
*Assistant Examiner* — Seth D Moser
(74) *Attorney, Agent, or Firm* — Dority & Manning, PA

(57) ABSTRACT

A head-up display system includes a laminated glass and a projection device. The laminated glass includes an outer glass sheet, a thermoplastic interlayer and an inner glass sheet. The laminated glass includes a first head-up display region and a second head-up display region. The projection device can generate first polarized light and second polarized light. At least about 70% of the first polarized light is p-polarized light, and at least about 70% of the second polarized light is p-polarized light.

20 Claims, 4 Drawing Sheets

Virtual image          Virtual image

(58) Field of Classification Search
USPC ................................................... 359/630, 633
See application file for complete search history.

(56) References Cited

U.S. PATENT DOCUMENTS

| | | | | |
|---|---|---|---|---|
| 2016/0257095 | A1* | 9/2016 | Cleary ................... | G02B 27/01 |
| 2018/0124364 | A1* | 5/2018 | Yata ..................... | H04N 9/3182 |
| 2020/0126305 | A1* | 4/2020 | Cappuccilli ........... | B60K 35/23 |
| 2020/0201037 | A1* | 6/2020 | Yamamoto ........... | G02B 5/0833 |
| 2020/0209619 | A1 | 7/2020 | Inoue | |
| 2020/0333598 | A1 | 10/2020 | Otani | |
| 2020/0406587 | A1* | 12/2020 | Nohara ................. | B32B 27/365 |
| 2021/0018749 | A1 | 1/2021 | Fischer et al. | |
| 2023/0113611 | A1* | 4/2023 | Lin ................... | G02F 1/133504 |
| | | | | 359/630 |
| 2024/0280819 | A1* | 8/2024 | Bronstein ......... | B32B 17/10174 |

FOREIGN PATENT DOCUMENTS

| | | |
|---|---|---|
| CN | 106483663 A | 3/2017 |
| CN | 107015369 A | 8/2017 |
| CN | 107045203 A | 8/2017 |
| CN | 109257939 A | 10/2019 |
| CN | 111301166 A | 6/2020 |
| CN | 111443489 A | 7/2020 |
| CN | 113238378 A | 8/2021 |
| CN | 114019689 A | 2/2022 |
| EP | 4397482 A1 | 7/2024 |
| KR | 20210069700 A | 6/2021 |
| WO | WO2019156030 A1 | 8/2019 |
| WO | WO2020094422 A1 | 5/2020 |
| WO | WO2021106665 A1 | 6/2021 |
| WO | WO2022214369 A1 | 10/2022 |

OTHER PUBLICATIONS

Third Party Observation for corresponding Application No. EP20220900494, dated Feb. 12, 2025, 9 pages.
Japanese Office Action for corresponding Application No. 2023-560023, dated Nov. 5, 2024, 2 pages.
Extended European Search Report for corresponding Application No. 22900494.0, dated Oct. 7, 2024, 6 pages.
Chinese Office Action (with English translation) received in corresponding Application No. CN 2021114456113, dated Jun. 16, 2022, 11 pages.
International Search Report received in corresponding Application No. PCT/CN2022/135209, dated Feb. 22, 2023, 6 pages.

\* cited by examiner

01

110

10

P1

20

P2

120

Virtual image

Virtual image

HEAD-UP DISPLAY SYSTEM

CROSS-REFERENCE TO RELATED APPLICATIONS

This application is a national phase entry of International patent application No. PCT/CN2022/135209, filed Nov. 30, 2022, which, in turn, claims priority to Chinese patent application No. 202111445611.3, titled "HEAD-UP DISPLAY SYSTEM", filed on Nov. 30, 2021, the contents of both of which are hereby incorporated by reference in their entirety.

TECHNICAL FIELD

The present application relates to the technical field of head-up display, in particular to a head-up display system.

BACKGROUND

A head-up display (HUD) refers to a driver-centered, blind-operated, multi-functional instrument panel. Its function is to project important driving information such as speed and navigation onto the windshield in front of the driver, so that the driver can see the driving information such as speed and navigation without bowing or turning the head, or looking away from the front, thereby improving driving safety.

A suitable angle of incidence of a conventional HUD generally does not exceed 70°. However, with the development of HUD, more technologies such as the augmented reality head-up display (AR-HUD) emerge. The AR-HUD requires a larger angle of incidence, in order to project a larger display image and to provide a larger field of view (FOV). As the angle of incidence increases, the issue of ghosting in head-up display projection imaging becomes more and more serious, making it increasingly challenging to resolve. The current HUD system cannot meet the demands for large-scale projection in AR-HUD.

SUMMARY

In view of the above, according to embodiments of the present application, a head-up display system is provided, and the technical solution is:

A head-up display system includes a laminated glass and a projection device.

The laminated glass includes an outer glass sheet, a thermoplastic interlayer, and an inner glass sheet. The thermoplastic interlayer is bonded between the outer glass sheet and the inner glass sheet. The laminated glass includes a first head-up display region and a second head-up display region. The visible light transmittance of the first head-up display region is greater than or equal to about 60%. The visible light transmittance of the second head-up display region is less than or equal to about 30%.

The projection device is capable of generating first polarized light and second polarized light. At least 70% of the first polarized light is p-polarized light, and at least about 70% of the second polarized light is p-polarized light.

The first polarized light is capable of being incident on the first head-up display region at an angle of incidence α in a range from about 45° to about 70°. The first head-up display region has a first reflectance, which is at least about 15%, to p-polarized light at an angle of incidence α of 65°. The first head-up display region is configured to display a first head-up display image.

The second polarized light is capable of being incident on the second head-up display region at an angle of incidence β of about 60° to 85°. The second head-up display region has a second reflectance, which is at least about 10%, to p-polarized light at an angle of incidence β of 65°. The second head-up display region is configured to display a second head-up display image.

In some embodiments, the outer glass sheet includes a first surface and a second surface. The inner glass sheet includes a third surface and a fourth surface. The thermoplastic interlayer is bonded between the second surface and the third surface.

The first head-up display region includes a first reflective coating, and the first reflective coating is located on the second surface, the third surface, or the fourth surface.

The second head-up display region includes a second reflective coating, and the second reflective coating is located on the second surface, the third surface, or the fourth surface.

The first reflective coating and the second reflective coating are made of the same or different materials.

In some embodiments, the second head-up display region further includes a visible light blocking layer, and the visible light blocking layer is located on the first surface, the second surface, the third surface, or the fourth surface, or is located on at least one surface of the thermoplastic interlayer, or is located inside the thermoplastic interlayer, and the visible light blocking layer is more adjacent to the first surface than the second reflective coating is.

In some embodiments, the extinction coefficient of the material of the visible light blocking layer is represented by k, and k is greater than or equal to $4.0 \times 10^{-6}$.

In some embodiments, the first reflective coating is a transparent nanofilm.

In some embodiments, the second reflective coating is a transparent nanofilm.

In some embodiments, the area of the first head-up display region is greater than that of the second head-up display region.

In some embodiments, the first head-up display region is located in a central area of the laminated glass, and the second head-up display region is located in a peripheral area of the laminated glass.

In some embodiments, the virtual image distance of the first head-up display region is in a range from about 7 meters to about 100 meters; and the virtual image distance of the second head-up display region is in a range from about 1 meter to about 5 meters.

In some embodiments, the visible light transmittance of the first head-up display region is greater than or equal to 70%; and the visible light transmittance of the second head-up display region is less than or equal to 10%.

In some embodiments, the proportion of p-polarized light in the second polarized light is less than or equal to the proportion of p-polarized light in the first polarized light.

In some embodiments, the brightness of the second polarized light is less than or equal to the brightness of the first polarized light, the brightness of the second polarized light is greater than or equal to 5000 nits, and the brightness of the first polarized light is greater than or equal to 8000 nits.

In some embodiments, in the first head-up display region and the second head-up display region, R4L(a) of the color of reflected light is less than or equal to 4, and R4L(b) of the color of reflected light is less than or equal to 4.

In some embodiments, a size of the second head-up display region, along a direction perpendicular to the bottom edge of the laminated glass, is greater than or equal to 30 cm.

In some embodiments, a difference between a maximum reflectance and a minimum reflectance of the first head-up display region to p-polarized lights with wavelength from 460 nm to 630 nm is less than or equal to 4%.

In some embodiments, a difference between a maximum reflectance and a minimum reflectance of the second head-up display region to p-polarized lights with wavelength from 460 nm to 630 nm is less than or equal to 4%.

In some embodiments, the transparent nanofilm includes sequentially stacked high refractive index material and low refractive index material, the refractive index of the high refractive index material is greater than 1.8, the refractive index of the low refractive index material is less than 1.7, the high refractive index material includes a compound containing at least one of the following elements: Ti, Zr, Nb, Si, Sb, Sn, Zn, In, Al, Ni, Cr, Mg, Mn, V, W, Hf, Ta, Mo, Ga, Y, Bi, Ta, or rare earth elements, and the low refractive index material is at least one of Si oxides, Si oxynitrides, Si carbon oxides, Al oxides, or mixtures thereof.

In some embodiments, an outermost layer of the transparent nanofilm includes a compound containing at least one of the following elements: Ti, Zr, Nb, Si, Sb, Sn, Zn, In, Al, Ni, Cr, Mg, Mn, V, W, Hf, Ta, Mo, Ga, Y, Bi, Ta, or rare earth elements, and a thickness of the outermost layer is greater than or equal to 4.5 nm.

In some embodiments, the transparent nanofilm includes at least an electrical conducting layer and dielectric layers, the electrical conducting layer is located between two dielectric layers, and the electrical conducting layer includes at least one of the following metal elements: Ag, Ni, Cr, Cu, Fe, Mn, Pt, Ti, Zn, Sn, Al, Si, or rare earth elements.

In some embodiments, a size of the second head-up display region, along a direction perpendicular to the lateral edge of the laminated glass, is greater than or equal to 30 cm; or a size of the second head-up display region, along a direction perpendicular to the top edge of the laminated glass, is greater than or equal to 30 cm.

In some embodiments, a material of the visible light blocking layer includes at least one of an inorganic absorbent material and an organic absorbent material.

Details of one or more embodiments of the present application are set forth in the following description, and other features, objects, and advantages of the present application will become apparent from the description and claims hereof.

BRIEF DESCRIPTION OF THE DRAWINGS

In order to more clearly describe the technical solutions in the embodiments of the present application or the conventional art, the drawings to be used in the description of the embodiments or the conventional art will be described briefly. Apparently, the drawings described below are merely for some embodiments of the present application. For ordinary skilled persons in the art, other drawings can also be obtained based on the following drawings without creative work.

DETAILED DESCRIPTION

Figure 1:
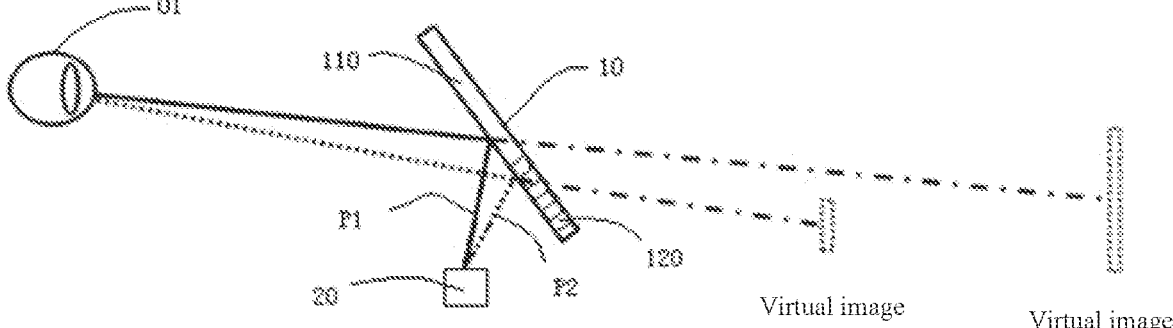
FIG. 1 is a schematic structural view of a local area of a head-up display system in an embodiment.

The following will clearly and completely describe the technical solutions in the embodiments of the present application with reference to the drawings in the embodiments of the present invention. Apparently, the described embodiments are merely some rather than all of the embodiments of the present application. All other embodiments obtained by a person of ordinary skill in the art based on the embodiments of the present application without making creative efforts shall fall within the protection scope of the present application.

Unless otherwise defined, all technical and scientific terms used herein have the same meaning as commonly understood by one of ordinary skill in the art to which the present application belongs. The terms used herein are only for the purpose of describing specific embodiments, and are not intended to limit the present application.

The Terms:

Unless otherwise specified or a contradiction exists, the meanings of the following terms and phrases used herein are as follows:

In the present application, a numerical range, unless otherwise specified, includes both endpoints thereof.

In the present application, "layer" can be understood as a single layer, or overlapped multiple layers.

In the present application, the thickness refers to a physical thickness.

In the present application, the refractive index refers to a refractive index for transmission light with a wavelength of 550 nm.

In the present application, the angle of incidence is the angle between a ray incident onto the fourth surface of the laminated glass from the projection device and the normal line to the fourth surface.

In order to demonstrate the reflection performance of the laminated glass, the reflectance to p-polarized light described in the present application is obtained by measuring the p-polarized light reflectance spectrum of the laminated glass with Cary7000 at a specified angle of incidence, and then calculating according to ISO9050.

In the present application, the meanings of main symbols are as follows:

$Rp(HT)$ represents reflectance to p-polarized light (according to ISO9050) at an angle of incidence of 65°, measured in the first head-up display region from the inner glass sheet side (i.e., the fourth surface) of the laminated glass.

$Rp(LT)$ represents reflectance to p-polarized light (according to ISO9050) at an angle of incidence of 65°, measured in the second head-up display region from the inner glass sheet side (i.e., the fourth surface) of the laminated glass.

$RL(HT)$ represents reflectance to visible light, measured in the first head-up display region from the inner glass sheet side (i.e., the fourth surface) of the laminated glass.

$RL(LT)$ represents reflectance to visible light, measured in the second head-up display region from the inner glass sheet side (i.e., the fourth surface) of the laminated glass.

$TL(HT)$ represents integrated transmittance (according to ISO9050) of normal incident visible light, measured in the first head-up display region from the outer glass sheet side (i.e., the first surface) of the laminated glass.

$TL(LT)$ represents integrated transmittance (according to ISO9050) of normal incident visible light, measured in the second head-up display region from the outer glass sheet side (i.e., the first surface) of the laminated glass.

$R4L(a)$ represents the red-green value of the color of visible light at a specified angle of incidence, based on a CIE1976, D65 light source.

R4L(b) represents the yellow-blue value of the color of visible light at a specified angle of incidence, based on a CIE1976, D65 light source.

The present application provides a head-up display system for large-scale projection and solving the ghosting problem in projection imaging.

In an embodiment, as shown in FIG. 1, a head-up display system includes a laminated glass 10 and a projection device 20, wherein the laminated glass 10 includes a first head-up display region 110 and a second head-up display region 120.

The projection device 20 is configured to emit relevant text and image information such as driving speed, engine revolutions, fuel consumption, tire pressure, dynamic navigation, night vision, real-scene map, etc. onto the laminated glass 10, so that the information can be seen by the observer 01 in the automobile, thereby realizing the head-up display (HUD), and even the augmented reality head-up display (AR-HUD). The projection device 20 is a device known to those skilled in the art, including but not limited to laser, light-emitting diode (LED), liquid crystal display (LCD), digital light processing (DLP), electroluminescence (EL), cathode-ray tube (CRT), vacuum fluorescent display (VFD), a collimator, a spherical corrector, a convex lens, a concave lens, a reflector, and/or a polarizer. Meanwhile, the position and angle of incidence of the projection device 20 are adjustable to suit an observer 01 at varied positions or heights in the automobile.

Further, the projection device 20 includes multiple sub projection devices, such as a sub projection device configured to project first polarized light P1 and a sub projection device configured to projected second polarized light P2. The projection device 20 is capable of generating first polarized light P1 and second polarized light P2. At least about 70% of the first polarized light P1 is p-polarized light, and at least about 70% of the second polarized light P2 is p-polarized light. It can be understood that the projection device 20 can alternatively be an integrated projection device, realizing projection of both first polarized light P1 and second polarized light P2 through the design of the internal light path.

In the present application, the visible light transmittance TL(HT) of the first head-up display region 110 is greater than or equal to about 60%, and the visible light transmittance TL(LT) of the second head-up display region 120 is less than or equal to about 30%.

In the present application, the first polarized light P1 is capable of being incident on the first head-up display region 110 at an angle of incidence α of about 45° to 70°. The reflectance Rp(HT) of the first head-up display region 110 to p-polarized light is greater than or equal to about 15%. The first head-up display region 110 is configured to display a first head-up display image.

In the present application, the second polarized light P2 is capable of being incident on the second head-up display region 120 at an angle of incidence β of about 60° to 85°. The reflectance Rp(LT) of the second head-up display region 120 to p-polarized light is greater than or equal to about 10%. The second head-up display region 120 is configured to display a second head-up display image.

The head-up display system of the present application can reflect light projected at a large angle of incidence, display high-brightness images, and can suppress the ghosting problem.

Optionally, the first head-up display region 110 and the second head-up display region 120 have different areas and can display different contents. In some embodiments, the area of the first head-up display region 110 is greater than that of the second head-up display region 120, so that the display content of the first head-up display region 110 is more abundant and convenient for the driver to observe, for example, information such as dynamic navigation and real-scene maps can be displayed. The second head-up display region 120 only displays necessary driving safety information, for example, can display driving speed, fuel consumption, contents in rear-view mirror, etc.

Optionally, the locations of the first head-up display region 110 and the second head-up display region 120 are different. In some embodiments, the first head-up display region 110 is located in the central area of the laminated glass, and the second head-up display region 120 is located in the peripheral area of the laminated glass.

It can be understood that the peripheral area of the laminated glass includes a top edge area, a lateral edge area, and a bottom edge area.

In an embodiment, the second head-up display region 120 is located in the bottom edge area of the laminated glass, for driving safety and to meet the standard requirements of automobile windshields.

Further, in the present application, in order to meet the projection requirements for the second head-up display region 120, the size (e.g., width) of the second head-up display region 120, along the direction perpendicular to the bottom edge of the laminated glass, is greater than or equal to about 30 cm.

Further, the size (e.g., width) of the second head-up display region 120, along the direction perpendicular to the lateral edge of the laminated glass, can be greater than or equal to about 30 cm. The size (e.g., width) of the second head-up display region 120, along the direction perpendicular to the top edge of the laminated glass, can be greater than or equal to about 30 cm.

It can be understood that the projection device 20 can generate polarized light at various angles, allowing the first polarized light P1 to be incident on the first head-up display region 110 at the angle of incidence α ranged from about 45° to about 70°, and the second polarized light P2 to be incident on the second head-up display region 120 at the angle of incidence β ranged from about 60° to about 85°.

Optionally, the virtual image distances VIDs of the first head-up display region 110 and the second head-up display region 120 are different from each other. In an embodiment, the virtual image distance VID1 of the first head-up display region 110 is in a range from about 7 meters to about 100 meters, so as to realize the large-size image display of AR-HUD; the virtual image distance VID2 of the second head-up display region 120 is in a range from about 1 meter to from 5 meters, which is configured to integrate the AR-HUD and the windshield head-up display (W-HUD) to perform dynamic display and static display at the same time. Optionally, VID1 can be changed or adjusted, including but not limited to automatically adjusting VID1 according to road conditions, such as being adjusted to about 7 meters to 50 meters, so as to realize the dynamic display of AR-HUD images.

The first head-up display region 110 is necessary for driving safety, so the visible light transmittance TL(HT) of the first head-up display region 110 is greater than or equal to about 60%, and in some embodiments, TL(HT) is greater than or equal to about 70% to meet the safety standards for automotive glass.

The visible light transmittance TL(LT) of the second head-up display region 120 is less than or equal to about 30% for suppressing large-angle ghosting. The lower the visible light transmittance of the second head-up display region 120, the better the suppression on ghosting, and the higher the contrast of the second head-up display image. Meanwhile, the lower the visible light transmittance of the second head-up display region 120, the wider the application range of the angle of incidence B of the second polarized light P2, so that the HUD projection with a large angle of incidence can be achieved. In some embodiments, TL(LT) is less than or equal to about 30%, in some embodiments, TL(LT) is less than or equal to about 10%, in some embodiments, TL(LT) is less than or equal to about 5%, in some embodiments, TL(LT) is less than or equal to about 2%, and in some embodiments, TL(LT) is less than or equal to about 1%.

In the present application, the angle of incidence α projected by the projection device 20 onto the first head-up display region 110 is a certain angle or in a certain angle range between about 45° and about 70°. Further optionally, the angle of incidence α is a certain angle or in a certain angle range between about 50° and about 70°. Further optionally, the angle of incidence α is a certain angle or a certain angle range between about 55° and about 68°. Further optionally, the angle of incidence α is a certain angle or in a certain angle range between about 50° and about 65°.

In the present application, the projection device 20 is configured for projection to the second head-up display region 120 at a certain angle or a certain angle range between about 60° and about 85°, which is the angle of incidence β required for suppressing large-angle ghosting. The advantage of the second head-up display region 120 in suppressing ghosting, especially suppressing ghosting at a large angle, can be fully utilized. For example, the projection to the second head-up display region 120 is at the angle of incidence greater than or equal to about 70°, to achieve high-contrast display images while suppressing ghosting. Further optionally, β is greater than or equal to about 68°, and further optionally, β is greater than or equal to about 70°, and further optionally, β is greater than or equal to about 75°.

In the present application, at least about 70% of the first polarized light projected by the projection device 20 is p-polarized light, and at least about 70% of the second polarized light projected by the projection device 20 is p-polarized light, which is beneficial to suppressing ghosting. Optionally, at least about 90% of the first polarized light is p-polarized light, and at least about 90% of the second polarized light is p-polarized light. Further optionally, about 100% of the first polarized light is p-polarized light, and about 100% of the second polarized light is p-polarized light, which is beneficial to HUD projection, reducing the complexity of the projection device, etc.

Considering that the projection device 20 should be designed to match with the first head-up display region 110 and the second head-up display region 120 to reduce power consumption, the proportion of p-polarized light in the second polarized light is less than or equal to the proportion of p-polarized light in the first polarized light. For example, about 100% of the first polarized light is p-polarized light, and p-polarized light takes about 70% and s-polarized light takes about 30% of the second polarized light, or p-polarized light takes about 80% and s-polarized light takes about 20% of the second polarized light, or p-polarized light takes about 90% and s-polarized light takes about 10% of the second polarized light.

Considering that the projection device 20 should be designed to match with the first head-up display region 110 and the second head-up display region 120 to reduce power consumption, the brightness of the second polarized light is lower than or equal to the brightness of the first polarized light. The brightness of the second polarized light is greater than or equal to about 5000 nits, and the brightness of the first polarized light is greater than or equal to about 8000 nits. For example, the brightness of the first polarized light is about 15000 nits, and the brightness of the second polarized light is about 12000 nits, or the brightness of the second polarized light is about 10000 nits, or the brightness of the second polarized light is about 8000 nits, or the brightness of the second polarized light is about 5000 nits.

In order to obtain a high-brightness image and suppress ghosting, in the present application, the reflectance Rp(HT) of the first head-up display region 110 to p-polarized light incident at about 65° is greater than or equal to about 15%. The reflectance Rp(LT) of the second head-up display region 120 to p-polarized light incident at about 65° is greater than or equal to about 10%. In some embodiments, Rp(LT) is greater than or equal to about 15%, and in some embodiments, Rp(LT) is greater than or equal to about 20%, which is beneficial to getting a clear image.

In order to realize that the reflectance Rp(HT) of the first head-up display region 110 to p-polarized light incident at about 65° is greater than or equal to about 15%, and the reflectance Rp(LT) of the second head-up display region 120 to p-polarized light incident at β which is about 65° is greater than or equal to about 10%, the structure and material of the laminated glass are designed.

Figure 2:
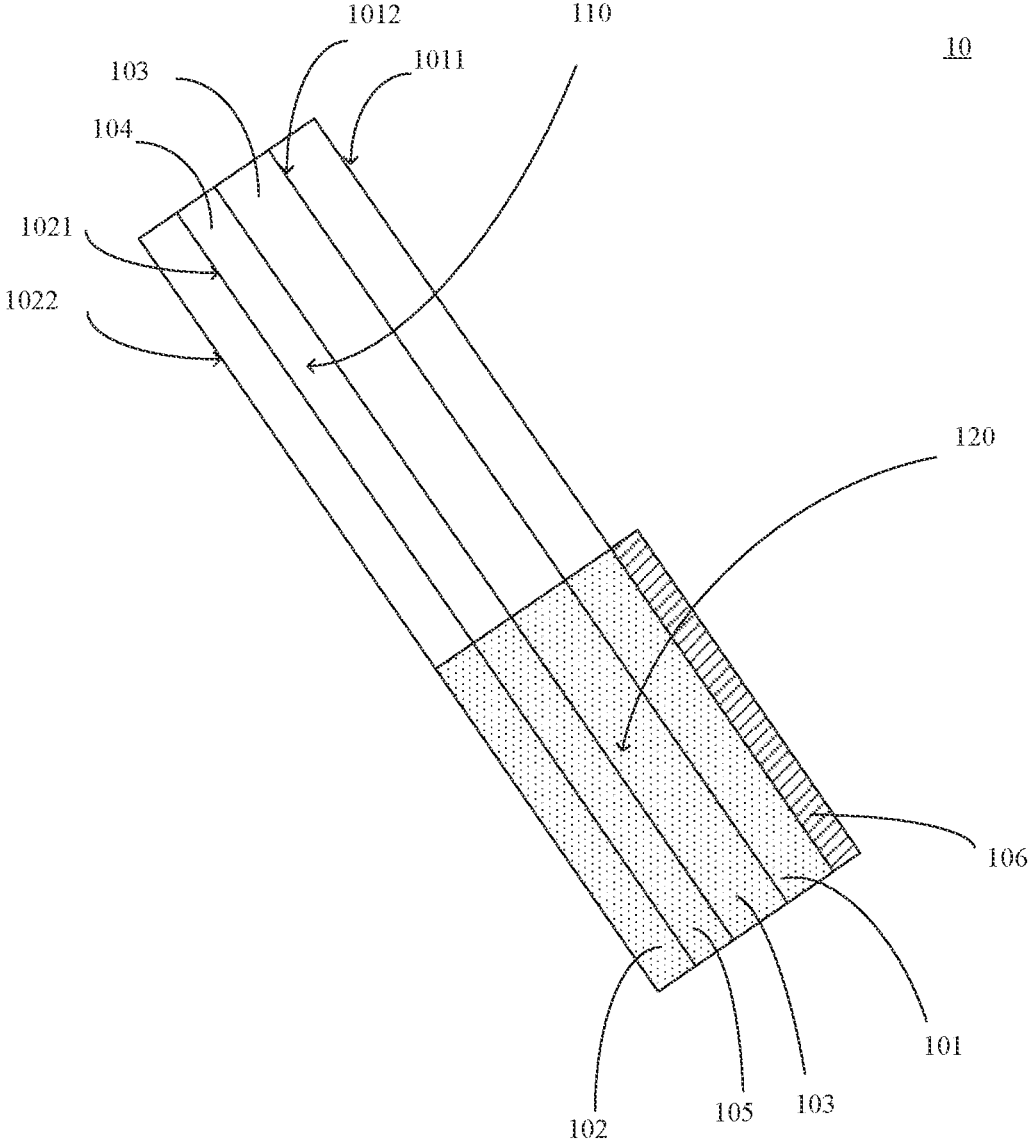
FIG. 2 is a schematic structural view of a laminated glass in an embodiment.

As shown in FIG. 2, which is a schematic structural view of an embodiment of the laminated glass 10, the laminated glass 10 includes an outer glass sheet 101, a thermoplastic interlayer 103, and an inner glass sheet 102. The outer glass sheet includes a first surface 1011 and a second surface 1012, and the inner glass sheet includes a third surface 1021 and a fourth surface 1022. The thermoplastic interlayer 103 is bonded between the second surface 1012 and the third surface 1021.

The first head-up display region 110 includes a first reflective coating 104, and the second head-up display region 120 includes a second reflective coating 105. In the present embodiment, the first reflective coating 104 and the second reflective coating 105 are made of the same material, and are both located on the third surface 1021, which can be formed by one coating step, and thus the process is simple and easy to implement.

Optionally, the first reflective coating 104 and the second reflective coating 105 can be respectively and independently located on the second surface 1012, the third surface 1021, or the fourth surface 1022; the materials of the two reflective coatings can be different from each other, providing more kinds of products to meet different functional needs. For example, the materials of the first reflective coating 104 and the second reflective coating 105 are different from each other, the first reflective coating 104 is located on the second surface 1012, and the second reflective coating 105 is located on the fourth surface 1022.

Optionally, at least one first reflective coating 104 is located in the first head-up display region 110, and at least one second reflective coating 105 is located in the second head-up display region 120.

Optionally, the first reflective coating 104 and/or the second reflective coating 105 are transparent nanofilms. In the present embodiment, both the first reflective coating 104 and the second reflective coating 105 are transparent nanofilms. The transparent nanofilms can be formed by sequentially stacking high refractive index material and low refractive index material. The refractive index of the high refractive index material is greater than about 1.8, and the refractive index of the low refractive index material is less than about 1.7. The high refractive index material includes a compound containing at least one of the following elements: Ti, Zr, Nb, Si, Sb, Sn, Zn, In, Al, Ni, Cr, Mg, Mn, V, W, Hf, Ta, Mo, Ga, Y, Bi, Ta, rare earth elements, etc. In some embodiments, the compound is resistant to acid and alkali, including but not limited to SiN, $ZnSnO_x$, $ZnSnMgO_x$, $TiO_x$, SiZrN, ZrN, etc. The low refractive index material is at least one of Si oxides, Si oxynitrides, Si oxycarbides, Al oxides, or mixtures thereof, such as a mixture of $SiO_2$ and $SiO_xN_y$, $SiAlO_x$, porous $Al_2O_3$, porous $SiO_2$, etc. Optionally, the low refractive index material can further include one or more of other metal elements, or compounds or mixtures of the metal elements, and the metal elements include, but are not limited to, Zr, Nb, Ti, Sb, Sn, Zn, In, Ni, Cr, Mg, Mn, V, W, Hf, Ta, Mo, Ga, Y, Bi, Ta, rare earth elements, etc. For example, the Si oxides further include one or more of $ZrO_2$, SiN, $MoO_2$, or $Y_2O_3$. Further, the mass percentage of the metal element is no more than 30% of the Si oxides. For example, the Si oxides include MgO, and the mass of MgO divided by the sum of the mass of the Si oxide and the mass of MgO is less than or equal to 30%. The mass percentage of the metal elements exceeding 30% is disadvantage to obtaining a low-refractive material with a refractive index less than or equal to 1.6, so the mass percentage of the metal element does not exceed 30%, and optionally the mass percentage of the metal element is greater than 10%. x satisfies $1<x\leq2$; y satisfies $1<y\leq2$.

For aesthetic considerations of the HUD, to avoid a red/yellowish when viewed from the side of the inner glass sheet, in some embodiments, R4L(a) of the color of reflected light is less than or equal to about 4 and R4L(b) of the color of reflected light is less than or equal to about 4 in the first head-up display region and the second head-up display region, which is beneficial to avoiding the red/yellowish inner glass sheet. However, it is difficult for some transparent nanofilms to achieve the above goals simply by adjusting the thickness of the film system while ensuring Rp(HT) and Rp(LT) and the smoothness of the corresponding spectrum. Therefore, in some embodiments, the outermost layer of the transparent nanofilm is a compound including at least one of the following elements: Ti, Zr, Nb, Si, Sb, Sn, Zn, In, Al, Ni, Cr, Mg, Mn, V, W, Hf, Ta, Mo, Ga, Y, Bi, Ta, rare earth elements, etc. In some embodiments, the compound is resistant to acid and alkali, including but not limited to SiN, $ZnSnO_x$, $ZnSnMgO_x$, $TiO_x$, SiZrN, ZrN, etc. The thickness of the outermost layer is larger than or equal to about 4.5 nm, otherwise it is difficult to avoid the red/yellowish when viewed from the side of the inner glass sheet.

Further, the transparent nanofilm includes at least an electrical conducting layer and dielectric layers, and the electrical conducting layer is located between two dielectric layers. The electrical conducting layer includes at least one of the following metal elements: Ag, Ni, Cr, Cu, Fe, Mn, Pt, Ti, Zn, Sn, Al, Si, or rare earth elements, such as Ag or Ag alloys. The dielectric layer includes at least one of the following elements: Zr, Nb, Si, Sb, Sn, Zn, In, Al, Ni, Cr, Mg, Mn, V, W, Hf, Ta, Mo, Ga, Y, Bi, Ta, rare earth elements, etc., and optionally includes an oxide including at least Zn and Sn and/or an nitride including at least Si. Optionally, the dielectric layer is one layer, as an example, including at least two elements, Zn and Sn, wherein the atomic ratio of Zn to Sn is in a range from about 0.4 to about 0.6. In an example, a $ZnSnO_x$ layer can be prepared by a sputtering method using a $ZnSnO_x$ ceramic target. In another example, a $ZnSnMgO_x$ layer can be prepared by a sputtering method using a $ZnSnMgO_x$ ceramic target.

Optionally, the second head-up display region further includes a visible light blocking layer, and the visible light blocking layer is located on the first surface, the second surface, the third surface, or the fourth surface, or is located on at least one surface of the thermoplastic interlayer, or is located inside the thermoplastic interlayer, and the visible light blocking layer is more adjacent to the first surface 1011 than the second reflective coating 105 is.

As shown in FIG. 2, in the present embodiment, the visible light blocking layer 106 is located on the first surface 1011.

Figure 3:
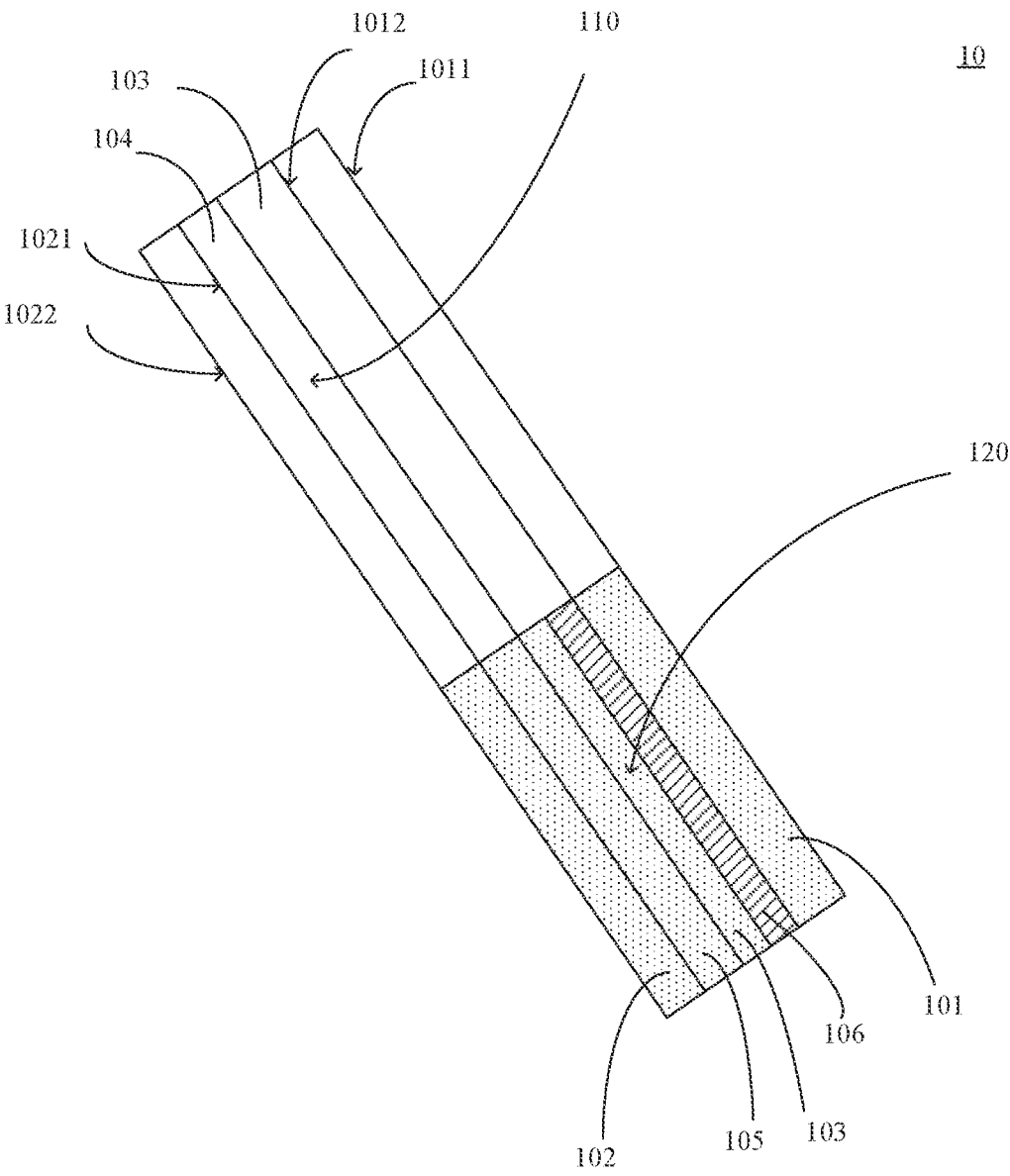
FIG. 3 is a schematic structural view of a laminated glass in another embodiment.

In another embodiment, the structure of the laminated glass is shown in FIG. 3, and the visible light blocking layer 106 of the second head-up display region 120 is located on the second surface 1012. Specifically, the laminated glass 10 includes the first head-up display region 110 and the second head-up display region 120; the laminated glass in the first head-up display region 110 includes the outer glass sheet 101, the thermoplastic interlayer 103, the first reflective coating 104, and the inner glass sheet 102 stacked with each other; the laminated glass in the second head-up display region 120 includes the outer glass sheet 101, the visible light blocking layer 106, the thermoplastic interlayer 103, the second reflective coating 105, and the inner glass sheet 102 stacked with each other. The outer glass sheet 101 includes a first surface 1011 and a second surface 1012, and the inner glass sheet 102 includes a third surface 1021 and a fourth surface 1022.

Figure 4:
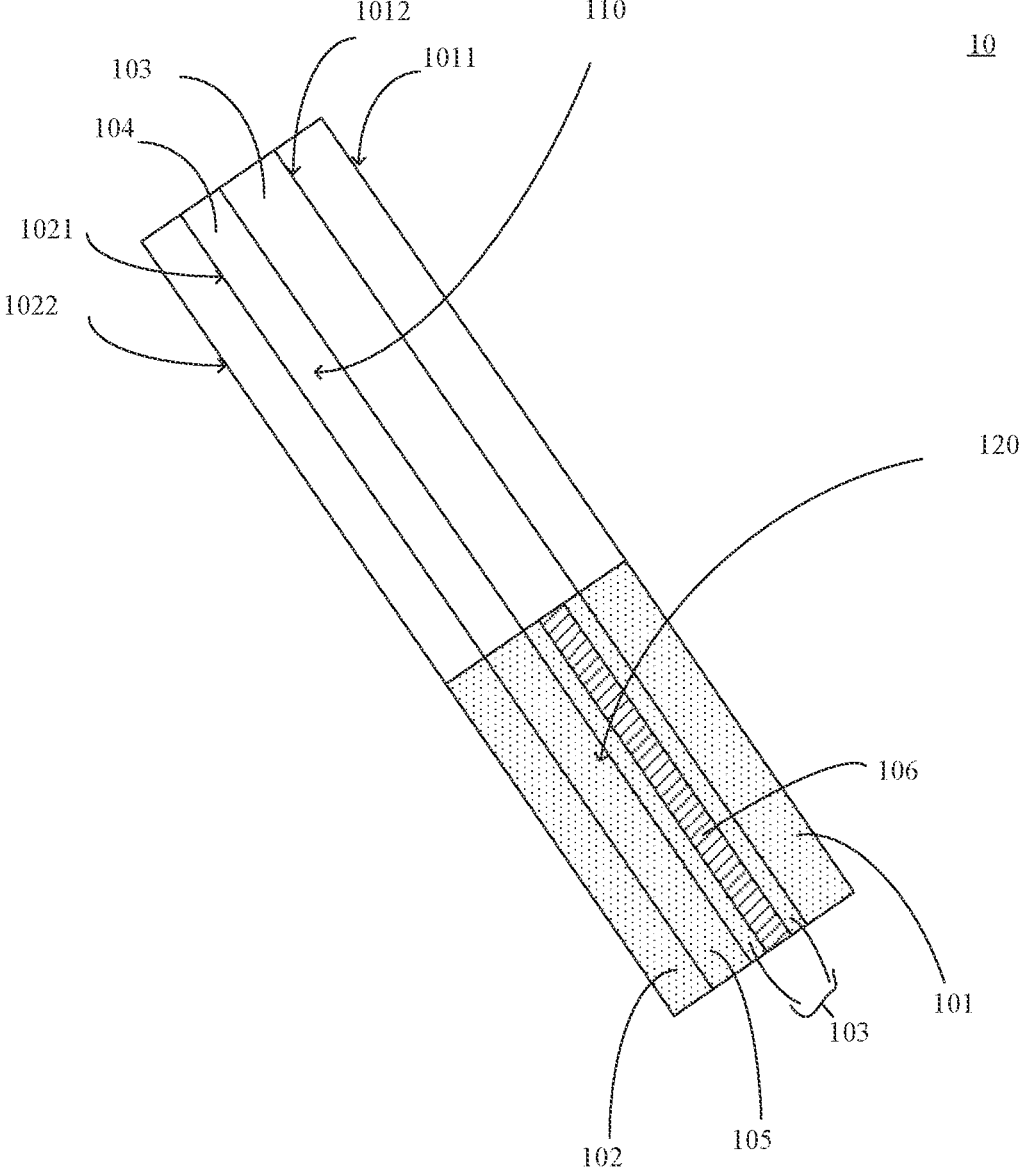
FIG. 4 is a schematic structural view of a laminated glass in yet another embodiment.

In another embodiment, as shown in FIG. 4, the visible light blocking layer 106 of the second head-up display region 120 is located inside the thermoplastic interlayer 103. Specifically, the laminated glass 10 includes the first head-up display region 110 and the second head-up display region 120; the laminated glass in the first head-up display region 110 includes the outer glass sheet 101, the thermoplastic interlayer 103, the first reflective coating 104, and the inner glass sheet 102 stacked with each other; the laminated glass in the second head-up display region 120 includes the outer glass sheet 101, the thermoplastic interlayer 103, the visible light blocking layer 106 inside the thermoplastic interlayer 103, the second reflective coating 105, and the inner glass sheet 102 stacked with each other. The outer glass sheet 101 includes a first surface 1011 and a second surface 1012, and the inner glass sheet 102 includes a third surface 1021 and a fourth surface 1022.

Optionally, the number of the visible light blocking layer 106 is at least one.

The structure of the laminated glass of the present application includes but not limited to the following enumerated structures:

In the first head-up display region:

The first reflective coating is located on the second surface: outer glass sheet/first reflective coating/thermoplastic interlayer/inner glass sheet.

The first reflective coating is located on the third surface: outer glass sheet/thermoplastic interlayer/first reflective coating/inner glass sheet.

The first reflective coating is located on the fourth surface: outer glass sheet/thermoplastic interlayer/inner glass sheet/first reflective coating.

In the second head-up display region:

The visible light blocking layer is located on the first surface, and the second reflective coating is located on the second surface: visible light blocking layer/outer glass sheet/second reflective coating/thermoplastic interlayer/inner glass sheet.

The visible light blocking layer is located on the first surface, and the second reflective coating is located on the third surface: visible light blocking layer/outer glass sheet/thermoplastic interlayer/second reflective coating/inner glass sheet.

The visible light blocking layer is located on the first surface, and the second reflective coating is located on the fourth surface: visible light blocking layer/outer glass sheet/thermoplastic interlayer/inner glass sheet/second reflective coating.

The visible light blocking layer is located on the second surface, and the second reflective coating is located on the visible light blocking layer: outer glass sheet/visible light blocking layer/second reflective coating/thermoplastic interlayer/inner glass sheet.

The visible light blocking layer is located on the second surface, and the second reflective coating is located on the third surface: outer glass sheet/visible light blocking layer/thermoplastic interlayer/second reflective coating/inner glass sheet.

The visible light blocking layer is located on the second surface, and the second reflective coating is located on the fourth surface: outer glass sheet/visible light blocking layer/thermoplastic interlayer/inner glass sheet/second reflective coating.

The second reflective coating is located on the third surface, and the visible light blocking layer is located on the second reflective coating: outer glass sheet/thermoplastic interlayer/visible light blocking layer/second reflective coating/inner glass sheet.

The visible light blocking layer is located on the third surface, and the second reflective coating is located on the fourth surface: outer glass sheet/thermoplastic interlayer/visible light blocking layer/inner glass sheet/second reflective coating.

The visible light blocking layer is located on the fourth surface, and the second reflective coating is located on the visible light blocking layer: outer glass sheet/thermoplastic interlayer/inner glass sheet/visible light blocking layer/second reflective coating.

Outer glass sheet/thermoplastic interlayer+visible light blocking layer/second reflective coating/inner glass sheet.

Outer glass sheet/thermoplastic interlayer+visible light blocking layer/inner glass sheet/second reflective coating.

It can be understood that "thermoplastic interlayer+visible light blocking layer" means that the visible light blocking layer is located on any surface of the thermoplastic interlayer or inside the thermoplastic interlayer, and this structure can be formed by stacking or splicing.

In order to obtain the second head-up display region, optionally, the extinction coefficient k of the material of the visible light blocking layer is greater than or equal to about $4.0 \times 10^{-6}$. Further optionally, the extinction coefficient k of the material of the visible light blocking layer is greater than or equal to about $1.0 \times 10^{-5}$. Further optionally, the extinction coefficient k of the material of the visible light blocking layer is greater than or equal to about $1.0 \times 10^{-4}$. Further optionally, the extinction coefficient k of the material of the visible light blocking layer is greater than or equal to about $1.0 \times 10^{-3}$. Further optionally, the extinction coefficient k of the material of the visible light blocking layer is larger than or equal to about $1.0 \times 10^{-2}$. Further optionally, the extinction coefficient k of the material of the visible light blocking layer is greater than or equal to about $1.0 \times 10^{-1}$. The greater the extinction coefficient of the material of the visible light blocking layer, the more significant the absorption effect, which is beneficial to achieving the second head-up display region and to reducing the thickness of the visible light blocking layer. If the extinction coefficient k of the material of the visible light blocking layer is less than about $4.0 \times 10^{-6}$, the thickness of the visible light blocking layer may be too large, for example, exceeding 2 mm.

Further, the material of the visible light blocking layer includes at least one of an inorganic absorbent material and an organic absorbent material. For example, the material of the visible light blocking layer includes an inorganic absorbent material, or the material of the visible light blocking layer includes an organic absorbent material, or the material of the visible light blocking layer includes an inorganic absorbent material and an organic absorbent material.

Further, the inorganic absorbent material includes at least one of carbon, iron, zirconium, silicon, aluminum, copper, nickel, cobalt, manganese, tungsten, chromium, zinc, tellurium, tin, titanium, or indium. For example, black inorganic absorbent materials include magnetite, carbon black, RuO, NiO, TiO, TiO—$Al_2O_3$, iron oxide, composite oxides composed of Cu—Fe—Mn, Cu—Cr, Cu—Cr—Mn, Cu—Cr—Mn—Ni, Cu—Cr—Fe, and Co—Cr—Fe, titanium black, titanium nitride, titanium oxynitride, etc. The typical dye carbon black is FW 200 (Degussa). For example, colored inorganic absorbent materials include iron oxide, chromium oxide, mixed-phase oxides, colored or transparent metal oxides, such as $TiO_2$, low-valence titanium oxide, titanium oxynitrides, $Fe_2O_3$, $Fe_3O_4$, $SnO_2$, $Cr_2O_3$, ZnO, CuO, NiO, and other metal oxides, (Ti, Cr, Sb)$O_2$, $CoAl_2O_4$ (Tenard blue), $ZnAl_2O_4$ (Linman green), (Fe, Cr)$_2O_3$, and sulfides, such as CdS, mica, synthetic mica, talc, sericite, kaolin, glass, or other siliceous materials. The materials can be alone or mixed in a uniform or continuous layer.

Further, the organic absorbent material is at least one of aromatic metal complexes, aliphatic metal complexes, aromatic metal complexes, mercaptophenol metal complexes, cyanine dyes, methine dyes, naphthoquinone-based dyes, anthraquinone-based dyes, metal phthalocyanine complexes, vanadyl phthalocyanine, oxocopper phthalocyanine, metal phthalocyanine derivative complexes, olefinic functional groups, alcohol functional groups, phenolic functional groups, ether functional groups, benzene functional groups, aldehyde functional groups, ketone functional groups, halogenated hydrocarbon functional groups, ester functional groups, carboxylic acid functional groups, azo pigments, anthraquinone pigments, indigo or thioindigo derivatives, diketopyrrolopyrrole pigments, perylene pigments, or phthalocyanine pigments. For example, black absorbent materials: dark azo pigments, perylene black pigments, aniline black pigments. Red pigments: DPP-Irgazin Rot BO (manufacturer: Ciba), Chinquaisia Margenta RT355D (manufacturer: Ciba), Hostaperm Rot E2B70 (manufacturer: Hoehst-Clariant), Sicotrans Rot L2817 (manufacturer: BASF), carmine, thioindigo, DC Rot 6 (also known as Lithol Rubine 13), and DC Rot 33 (also known as Acid Fuchsin). Blue pigments: Hostaperm Blau AFL (manufacturer: Hoechst-Clariant), Irgazin Blau A3RN (manufacturer: Ciba), Paliogen Blau L6470 (manufacturer: BASF), Prussian blue, and FDC Blau 1 (also known as brilliant blue). Green pigments: Monostar Green 64 Spezial (manufacturer: Zeneca-ICI), Hostapem Gruen 8G (manufacturer: Hoechst-Clariant), DC Gruen 5 (also known as Alizarin Cyanine Green F). Yellow pigments: Irgazin Gelb 5GTL (manufacturer: Ciba), Irgacolor Gelb 2GLMA (manufacturer: Ciba), FDC Gelb 5 (also known as Tartrazine Yellow), FDC Gelb 6 (also known as Sunset Yellow or Sunset Gelb).

One or more above-mentioned inorganic absorbent materials and organic absorbent materials can be in coatings, film layers, diaphragms, colloids, etc. For example, carbon black can exist in ink, whereas $NiCrO_x$ can be used alone as a layer. The organic absorbent material can be present in tinted PVB or tinted EVA. Typical commercially available ink products: black inks, colored inks, infrared thermal insulation inks, conductive inks, luminescent inks, high temperature inks, low temperature inks, colored glazes, black glazes, etc. The material of the visible light blocking layer includes but is not limited to one or more of a black ink, a colored ink, an infrared thermal insulation ink, a colored glaze, or a black glaze for automobile glass. Typical tinted PVB: colorful PVB, blue PVB, black PVB, gray PVB, etc. Typical tinted EVA: colorful EVA, blue EVA, black EVA, gray EVA. In some embodiments, the material of the visible light blocking layer is a PVB film containing carbon black, which is beneficial to reduce the influence of ordinary ink on the local temperature of the glass during the hot bending process of the outer glass sheet and/or the inner glass sheet, thereby reducing defects such as light distortion of glass.

In the present application, the reflectance spectrum of p-polarized light corresponding to Rp(HT) is smooth, that is, the maximum difference of spectral reflectance corresponding to p-polarized light spectral reflectance curve in the wavelength range from 460 nm to 630 nm, measured from the inner glass sheet in the first head-up display region, is less than or equal to about 4% (relative to 100% incident radiation), and such as less than or equal to about 2%, so as to meet the needs of commercialization. The term "maximum difference" refers to the difference between the maximum reflectance and the minimum reflectance of the first head-up display region to p-polarized lights with the wavelengths from about 460 nm to 630 nm.

In the present application, the reflectance spectrum of p-polarized light corresponding to Rp(LT) is smooth, that is, the maximum difference of spectral reflectance corresponding to p-polarized light spectral reflectance curve in the wavelength range from 460 nm to 630 nm, measured from the inner glass sheet in the second head-up display region, is less than or equal to about 4% (relative to 100% incident radiation), and such as less than or equal to about 2%, so as to meet the needs of commercialization. The term "maximum difference" refers to the difference between the maximum reflectance and the minimum reflectance of the second head-up display region to p-polarized lights with the wavelengths from about 460 nm to 630 nm.

Further description will be provided based on specific examples and comparative examples. In these examples, unless otherwise specified, the raw materials can be commercially available, and the instruments used can also be commercially available.

Examples 1 to 3 and Comparative Examples 1 to 3

The projection light source in the head-up display system of Examples 1 to 3 and Comparative Examples 1 to 3 is a TFT-LCD projector with LED backlight, which further includes a plurality of reflectors. By adjusting the position of the projector and the angle of incidence of light, the observer can observe the clearest display image.

In Examples 1 to 3 and Comparative Examples 1 to 3, 100% of incident light is p-polarized light, which is respectively projected to the first head-up display region (HT) at the angle of incidence $\alpha$ (=65°) and to the second head-up display region (LT) at the angle of incidence $\beta$ (=75°) in Examples 1 to 3, while respectively observing the ghosting effects at the angles of reflection corresponding to $\alpha$=65° and $\beta$=75°.

Comparative Example 1

A soda-lime silicate float glass with a thickness of 2.1 mm produced by Fuyao Group is used as a base sheet. After cutting, edging, washing, and drying, the base sheet enters the magnetron sputtering coating process for coating deposition. A 45 nm-thick $ZnSnO_x$ layer, a 52 nm-thick $TiO_x$ layer, a 111 nm-thick $SiO_2$ layer, and a 5 nm-thick SiN layer are deposited on the entire surface of the base sheet to form a transparent nanofilm as a reflective coating. After the coating deposition, a soda-lime silicate float glass with a thickness of 2.1 mm produced by Fuyao Group is used as a matching sheet, which is then shaped according to the high-temperature molding process of automobile glass. A clear PVB film with a thickness of 0.76 mm is sandwiched by the two glass sheets, and then the sheets are combined in an autoclave under high pressure.

Example 1

A soda-lime silicate float glass with a thickness of 2.1 mm produced by Fuyao Group is used as a base sheet. After cutting, edging, washing, and drying, the base sheet enters the magnetron sputtering coating process for coating deposition. A 45 nm-thick $ZnSnO_x$ layer, a 52 nm-thick $TiO_x$ layer, a 111 nm-thick $SiO_2$ layer, and a 5 nm-thick SiN layer are deposited on the entire surface (the fourth surface) of the base sheet to form a transparent nanofilm as the first reflective coating and the second reflective coating. After the coating deposition, a soda-lime silicate float glass with a thickness of 2.1 mm produced by Fuyao Group is used as a matching sheet, which is then shaped according to the high-temperature molding process of automobile glass. A PVB film with a thickness of 0.76 mm is sandwiched by the two glass sheets, wherein the PVB film is clear in the first head-up display region and tinted in the second head-up display region (including a 30 cm-wide tinted band), and then the sheets are combined in an autoclave under high pressure.

Comparative Example 2

A soda-lime silicate float glass with a thickness of 1.8 mm produced by Fuyao Group is used as a base sheet. After cutting, edging, washing, and drying, the base sheet enters the magnetron sputtering coating process for coating deposition. A 32.5 nm-thick SiN layer, a 10 nm-thick AZO layer, a 13.8 nm-thick Ag layer, a 10 nm-thick AZO layer, a 77 nm-thick $ZnSnO_x$ layer, a 10 nm-thick AZO layer, a 5.7 nm-thick Ag layer, a 10 nm-thick AZO layer, and a 34 nm-thick SiN layer are deposited on the entire surface (the fourth surface) of the base sheet to form a transparent nanofilm as a reflective coating. After the coating deposition, a soda-lime silicate float glass with a thickness of 2.1 mm produced by Fuyao Group is used as a matching sheet, which is then shaped according to the high-temperature molding process of automobile glass. A clear PVB film with a thickness of 0.76 mm is sandwiched by the two glass sheets, and then the sheets are combined in an autoclave under high pressure.

Example 2

A soda-lime silicate float glass with a thickness of 1.8 mm produced by Fuyao Group is used as a base sheet. After cutting, edging, washing, and drying, the base sheet enters the magnetron sputtering coating process for coating deposition. A 32.5 nm-thick SiN layer, a 10 nm-thick AZO layer, a 13.8 nm-thick Ag layer, a 10 nm-thick AZO layer, a 77 nm-thick $ZnSnO_x$ layer, a 10 nm-thick AZO layer, a 6.2 nm-thick Ag layer, a 10 nm-thick AZO layer, and a 34 nm-thick SiN layer are deposited on the entire surface (the fourth surface) of the base sheet to form a transparent nanofilm as the first reflective coating and the second reflective coating. After the coating deposition, a soda-lime silicate float glass with a thickness of 2.1 mm produced by Fuyao Group is used as a matching sheet. The first surface of the matching sheet in the second head-up display region is coated with GP265 tempered glass pigment (produced by Tao Yise Glaze Co., Ltd.), and the coating width is 30 cm. The matching sheet is sintered at high temperature, and is then shaped according to the high-temperature molding process of automobile glass. A clear PVB film with a thickness of 0.76 mm is sandwiched by the two glass sheets, and then the sheets are combined in an autoclave under high pressure.

Comparative Example 3

A soda-lime silicate float glass with a thickness of 1.1 mm produced by Fuyao Group is used as a base sheet. After cutting, edging, washing, and drying, the base sheet enters the magnetron sputtering coating process for coating deposition. A 5 nm-thick $TiO_x$ layer, a 100 nm-thick $TiSiO_x$ layer, and a 110 nm-thick $SiO_2$ layer are deposited on the entire surface (the fourth surface) of the base sheet to form a transparent nanofilm as a reflective coating. After the coating deposition on the fourth surface, the other surface (the third surface) of the base sheet is treated as follows: after washing and drying processes, the base sheet enters the magnetron sputtering coating process for coating deposition. A 35 nm-thick SiN layer, a 10 nm-thick AZO layer, a 6 nm-thick Ag layer, a 10 nm-thick AZO layer, a 91 nm-thick $ZnSnO_x$ layer, a 10 nm-thick AZO layer, a 11.5 nm-thick Ag layer, a 10 nm-thick AZO layer, a 33.5 nm-thick SiN layer are deposited on the entire third surface of the base sheet to form a transparent nanofilm as a reflective coating. A soda-lime silicate float glass with a thickness of 2.1 mm produced by Fuyao Group is used as a matching sheet, which is then shaped according to the high-temperature molding process of automobile glass. A clear PVB film with a thickness of 0.76 mm is sandwiched by the two glass sheets, and then the sheets are combined in an autoclave under high pressure.

Example 3

A soda-lime silicate float glass with a thickness of 1.1 mm produced by Fuyao Group is used as a base sheet. After cutting, edging, washing, and drying, the base sheet enters the magnetron sputtering coating process for coating deposition. A 5 nm-thick $TiO_x$ layer, a 100 nm-thick $TiSiO_x$ layer, and a 110 nm-thick $SiO_2$ layer are deposited on the entire surface (the fourth surface) of the base sheet to form a transparent nanofilm as the first reflective coating and the second reflective coating. After the coating deposition on the fourth surface, the other surface (the third surface) of the base sheet is treated as follows: after washing and drying processes, the base sheet enters the magnetron sputtering coating process for coating deposition. A 35 nm-thick SiN layer, a 10 nm-thick AZO layer, a 6 nm-thick Ag layer, a 10 nm-thick AZO layer, a 91 nm-thick $ZnSnO_x$ layer, a 10 nm-thick AZO layer, a 11.5 nm-thick Ag layer, a 10 nm-thick AZO layer, a 33.5 nm-thick SiN layer are deposited on the entire third surface of the base sheet to form a transparent nanofilm as the first reflective coating and the second reflective coating. A soda-lime silicate float glass with a thickness of 2.1 mm produced by Fuyao Group is used as a matching sheet, which is then shaped according to the high-temperature molding process of automobile glass. A clear PVB film with a thickness of 0.76 mm is sandwiched by the two glass sheets, and a black PVB film with a thickness of 0.38 mm is attached onto the second head-up display region. The width of the black PVB film is 35 cm. Then the sheets are combined in an autoclave under high pressure.

The performance test items and results of Examples 1 to 3 and Comparative Examples 1 to 3 are shown in Table 1.

TABLE 1

Performance comparison of Examples 1 to 3 and Comparative Examples 1 to 3

| | Comparative | Example 1 | |
| | Example 1 | HT region | LT region |
| --- | --- | --- | --- |
| Performance | | | |
| TL | 72.3% | 72.3% | 17.3% |
| RL | 14.9% | 14.9% | 12.4% |
| R4L(a) | −5.6 | −5.6 | −5.8 |
| R4L(b) | −4.9 | −4.9 | −5.9 |
| Rp | 15.7% | 15.7% | 15.2% |
| Maximum difference | 3.8% | 3.8% | 3.8% |
| Display effect | Angle of incidence α = 65°, no ghosting is observed; Angle of incidence β = 75°, an obvious double image is observed | Angle of incidence α = 65°, no ghosting is observed | Angle of incidence β = 75°, no ghosting is observed |

| | Comparative | Example 2 | |
| | Example 2 | HT region | LT region |
| --- | --- | --- | --- |
| Performance | | | |
| TL | 71.5% | 71.5% | 0 |
| RL | 18.8% | 18.8% | 16.4% |
| R4L(a) | −3.7 | −3.7 | −2.7 |
| R4L(b) | −7.1 | −7.1 | −8.3 |
| Rp | 15.3% | 15.3% | 14.5% |
| Maximum difference | 1.9% | 1.9% | 1.9% |
| Display effect | Angle of incidence α = 65°, no ghosting is observed; Angle of incidence β = 75°, an obvious double image is observed | Angle of incidence α = 65°, no ghosting is observed | Angle of incidence β = 75°, no ghosting is observed |

| | Comparative | Example 3 | |
| | Example 3 | HT region | LT region |
| --- | --- | --- | --- |
| Performance | | | |
| TL | 72.7% | 72.7% | 0 |
| RL | 19.6% | 19.6% | 17.2% |
| R4L(a) | −2.5 | −2.5 | −1.5 |
| R4L(b) | −5.7 | −5.7 | −6.9 |
| Rp | 19.5% | 19.5% | 18.9% |
| Maximum difference | 1.5% | 1.5% | 1.5% |
| Display effect | Angle of incidence α = 65°, no ghosting is observed; Angle of incidence β = 75°, an obvious double image is observed | Angle of incidence α = 65°, no ghosting is observed | Angle of incidence β = 75°, no ghosting is observed |

It can be seen from Table 1 that there is no visible light blocking layer in the second head-up display region in Comparative Examples 1 to 3, so that the ghosting in the second head-up display region cannot be eliminated. In Examples 1 to 3, the second head-up display region is equipped with the visible light blocking layer, which can eliminate the ghosting in the second head-up display region. The present application provides a good head-up display effect in both the first head-up display region and the second head-up display region, ensures that not only the first head-up display region has a high visible light transmittance, but also the second head-up display region has a good visible light reflection color, and achieves a high p-polarized light reflectance and a smooth reflectance spectrum, making the maximum difference less than or equal to 4%.

The technical features of the above-mentioned embodiments can be combined arbitrarily. In order to make the description concise, not all possible combinations of the technical features are described in the embodiments. However, as long as there is no contradiction in the combination of these technical features, the combinations should be considered as in the scope of the present application.

The above-described embodiments are only several implementations of the present application, and the descriptions are relatively specific and detailed, but they should not be construed as limiting the scope of the present application. It should be understood by those of ordinary skill in the art that various modifications and improvements can be made without departing from the concept of the present application, and all fall within the protection scope of the present application. Therefore, the patent protection of the present application shall be defined by the appended claims.

What is claimed is:

1. A head-up display system, comprising a laminated glass and a projection device, wherein the laminated glass comprises an outer glass sheet, a thermoplastic interlayer, and an inner glass sheet, the thermoplastic interlayer is bonded between the outer glass sheet and the inner glass sheet, the laminated glass comprises a first head-up display region and a second head-up display region, the visible light transmittance of the first head-up display region is greater than or equal to about 60%, the visible light transmittance of the second head-up display region is less than or equal to about 30%;

the projection device is capable of generating first polarized light and second polarized light, at least about 70% of the first polarized light is p-polarized light, and at least about 70% of the second polarized light is p-polarized light;

the first polarized light is capable of being incident on the first head-up display region at an angle of incidence a in a range from about 45° to about 70°, the first head-up display region has a first reflectance, which is at least about 15%, to p-polarized light at an angle of incidence of 65°, the first head-up display region is configured to display a first head-up display image;

the second polarized light is capable of being incident on the second head-up display region at an angle of incidence β of about 60° to 85°, the second head-up display region has a second reflectance, which is at least about 10%, to p-polarized light at an angle of incidence β of 65°, the second head-up display region is configured to display a second head-up display image.

2. The head-up display system according to claim 1, wherein the outer glass sheet comprises a first surface and a second surface, the inner glass sheet comprises a third surface and a fourth surface, the thermoplastic interlayer is bonded between the second surface and the third surface;

the first head-up display region comprises a first reflective coating, and the first reflective coating is located on the second surface, the third surface, or the fourth surface;

the second head-up display region comprises a second reflective coating, and the second reflective coating is located on the second surface, the third surface, or the fourth surface;

the first reflective coating and the second reflective coating are made of a same or different materials.

3. The head-up display system according to claim 2, wherein the second head-up display region further comprises a visible light blocking layer, and the visible light blocking layer is located on the first surface, the second surface, the third surface, or the fourth surface, or is located on at least one surface of the thermoplastic interlayer, or is located inside the thermoplastic interlayer, and the visible light blocking layer is more adjacent to the first surface than the second reflective coating is.

4. The head-up display system according to claim 3, a material of the visible light blocking layer includes at least one of an inorganic absorbent material and an organic absorbent material.

5. The head-up display system according to claim 3, wherein the extinction coefficient of material of the visible light blocking layer is represented by k, and k is greater than or equal to $4.0 \times 10^{-6}$.

6. The head-up display system according to claim 2, wherein the first reflective coating is a transparent nanofilm, and/or the second reflective coating is a transparent nanofilm.

7. The head-up display system according to claim 6, wherein the transparent nanofilm comprises sequentially stacked high refractive index material and low refractive index material, the refractive index of the high refractive index material is greater than 1.8, the refractive index of the low refractive index material is less than 1.7, the high refractive index material comprises a compound containing at least one of following elements: Ti, Zr, Nb, Si, Sb, Sn, Zn, In, Al, Ni, Cr, Mg, Mn, V, W, Hf, Ta, Mo, Ga, Y, Bi, Ta, or rare earth elements, and the low refractive index material is at least one of Si oxides, Si oxynitrides, Si carbon oxides, Al oxides, or mixtures thereof.

8. The head-up display system according to claim 6, wherein an outermost layer of the transparent nanofilm comprises a compound containing at least one of following elements: Ti, Zr, Nb, Si, Sb, Sn, Zn, In, Al, Ni, Cr, Mg, Mn, V, W, Hf, Ta, Mo, Ga, Y, Bi, Ta, or rare earth elements, a thickness of the outermost layer is greater than or equal to 4.5 nm.

9. The head-up display system according to claim 5, wherein the transparent nanofilm comprises at least an electrical conducting layer and dielectric layers, the electrical conducting layer is located between two dielectric layers, and the electrical conducting layer comprises at least one of following metal elements: Ag, Ni, Cr, Cu, Fe, Mn, Pt, Ti, Zn, Sn, Al, Si, or rare earth elements.

10. The head-up display system according to claim 1, wherein the area of the first head-up display region is greater than that of the second head-up display region.

11. The head-up display system according to claim 10, wherein the first head-up display region is located in a central area of the laminated glass, and the second head-up display region is located in a peripheral area of the laminated glass.

12. The head-up display system according to claim 1, wherein the virtual image distance of the first head-up display region is in a range from about 7 meters to about 100 meters; and the virtual image distance of the second head-up display region is in a range from about 1 meter to about 5 meters.

13. The head-up display system according to claim 1, wherein the visible light transmittance of the first head-up display region is greater than or equal to 70%; and the visible light transmittance of the second head-up display region is less than or equal to 10%.

14. The head-up display system according to claim 1, wherein the proportion of p-polarized light in the second polarized light is less than or equal to the proportion of p-polarized light in the first polarized light.

15. The head-up display system according to claim 1, wherein the brightness of the second polarized light is less than or equal to the brightness of the first polarized light, the brightness of the second polarized light is greater than or equal to 5000 nits, and the brightness of the first polarized light is greater than or equal to 8000 nits.

16. The head-up display system according to claim 1, wherein in the first head-up display region and the second head-up display region, R4L(a) of color of reflected light is less than or equal to 4, and R4L(b) of color of reflected light is less than or equal to 4.

17. The head-up display system according to claim 1, wherein a size of the second head-up display region, along a direction perpendicular to a bottom edge of the laminated glass, is greater than or equal to 30 cm.

18. The head-up display system according to claim 1, wherein a difference between a maximum reflectance and a minimum reflectance of the first head-up display region to p-polarized lights with wavelengths from 460 nm to 630 nm is less than or equal to 4%.

19. The head-up display system according to claim 1, wherein a difference between a maximum reflectance and a minimum reflectance of the second head-up display region to p-polarized lights with wavelengths from 460 nm to 630 nm is less than or equal to 4%.

20. The head-up display system according to claim 1, wherein a size of the second head-up display region, along a direction perpendicular to a lateral edge of the laminated glass, is greater than or equal to 30 cm; or a size of the second head-up display region, along a direction perpendicular to a top edge of the laminated glass, is greater than or equal to 30 cm.

\* \* \* \* \*